US008337612B2

(12) United States Patent
Abdullah et al.

(10) Patent No.: US 8,337,612 B2
(45) Date of Patent: Dec. 25, 2012

(54) ENVIRONMENT FRIENDLY COMPOSITE CONSTRUCTION MATERIALS

(75) Inventors: Mohd Mustafa Al Bakri Abdullah, Riyadh (SA); Mohammed A Binhussain, Riyadh (SA); Kamarudin Hussin, Riyadh (SA); Mohd Ruzaidi Ghazali, Riyadh (SA); Norazian Mohammed Noor, Riyadh (SA); Mohammad Tamizi Selimin, Riyadh (SA)

(73) Assignee: King Abdulaziz City for Science and Technology, Riyadh (SA)

( * ) Notice: Subject to any disclaimer, the term of this patent is extended or adjusted under 35 U.S.C. 154(b) by 0 days.

(21) Appl. No.: 13/208,363

(22) Filed: Aug. 12, 2011

(65) Prior Publication Data

US 2011/0290153 A1 Dec. 1, 2011

(30) Foreign Application Priority Data

Dec. 28, 2010 (MY) .......................... PI 2010006250

(51) Int. Cl.
| C04B 7/00 | (2006.01) |
| C04B 14/00 | (2006.01) |
| C04B 14/40 | (2006.01) |
| C04B 18/06 | (2006.01) |
| C04B 16/08 | (2006.01) |
| C04B 20/00 | (2006.01) |
| C04B 38/00 | (2006.01) |
| C04B 7/32 | (2006.01) |
| C04B 7/36 | (2006.01) |
| C04B 9/11 | (2006.01) |
| C04B 11/28 | (2006.01) |
| C04B 28/06 | (2006.01) |
| C04B 2/10 | (2006.01) |
| C04B 9/04 | (2006.01) |
| C04B 11/00 | (2006.01) |
| C04B 28/14 | (2006.01) |

(52) U.S. Cl. ........ 106/694; 106/702; 106/681; 106/706; 106/773; 106/740; 106/811; 106/812

(58) Field of Classification Search .................. 106/694, 106/702, 681, 706, 773, 811, 812, 740
See application file for complete search history.

(56) References Cited

U.S. PATENT DOCUMENTS

2009/0090277 A1* 4/2009 Joshi et al. .................... 106/709

OTHER PUBLICATIONS

Ranga, B.V. Hardjito, D. "Development and Properties of Low Calcium Fly Ash based Geopolymer Concrete". Curtin University of Technology. 2005 [Retrieved Dec. 15, 2011]. Retrieved from [http://www.geopolymer.org/fichiers_pdf/curtin-flyash-GP-concrete-report.pdf].*

* cited by examiner

Primary Examiner — Anthony J Green
Assistant Examiner — Karam Hijji
(74) Attorney, Agent, or Firm — Raj Abhyanker, P.C.

(57) ABSTRACT

Disclosed are a system, a method and/or composition of environment friendly composite construction material. In one aspect, a method includes providing a mixture of a pozzolanic material and/or a kaolin clay with an activator solution to form an alumino-silicate cementitious material through a resulting geo-polymerization process. The alumino-silicate cementitious material is in the form of a paste. The method also includes processing the alumino-silicate cementitious material to transform the alumino-silicate cementitious material that is in the form of the paste to a form of a powder of the alumino-silicate cementitious material. The method further includes mixing the alumino-silicate cementitious material which is in the form of the powder with water to control a workability of the alumino-silicate cementitious material. Furthermore the method includes combining a mixture of the alumino-silicate cementitious material and water with a coarse aggregate, a fine aggregate and/or a plasticizer to form a composite construction material.

12 Claims, 9 Drawing Sheets

| MATERIAL 502 | FLY ASH & KAOLIN 504 | SODIUM SILICATE 506 | NaOH 508 | FINE AGGREGATE 510 | COARSE AGGREGATE 512 | WATER 514 |
|---|---|---|---|---|---|---|
| WEIGHT (KG) 516 | 350 - 400 | 100 - 150 | 30 - 60 | 500 - 600 | 1200 - 1400 | 60 - 400 |

AMOUNT OF MATERIALS FOR PRODUCING A CONCRETE BLOCK 500

FIGURE 5

| PROPERTIES 602 | CONCRETE 604 | LIGHT WEIGHT CONCRETE 606 |
|---|---|---|
| COMPRESSIVE STRENGTH 608 | 15 - 80MPa | 10 - 40MPa |
| DENSITY 610 | 1800 - 2200KG/M$^3$ | 1000 - 1600KG/M$^3$ |
| WATER ABSORPTION 612 | 0.01 - 2.00% | 0.1 - 5.0% |
| FIRE RESISTANCE 614 | STABLE AT TEMPERATURE UP TO 1000°C | STABLE AT TEMPERATURE UP TO 1000°C |
| POROSITY 616 | 0.1 - 0.4% | 0.1 - 30% |
| SETTING TIME 618 | 1 - 2 HOURS | 2 - 4 HOURS |
| STRENGTH GAIN 620 | 1 - 3 DAYS (FULL STRENGTH) | 1 - 3 DAYS (FULL STRENGTH) |

MECHANICAL AND PHYSICAL PROPERTIES OF THE CONCRETES 600

FIGURE 6

ENVIRONMENT FRIENDLY COMPOSITE CONSTRUCTION MATERIALS

CLAIM OF PRIORITY

This application claims priority under U.S.C. §1.55 from Malaysian Application No. PI 2010006250 filed in Malaysia on Dec. 28, 2010, the entire disclosure of which is incorporated hereinafter.

FIELD OF TECHNOLOGY

This disclosure relates generally to the technical fields of concrete and cement production and in particular to environment friendly composite construction material.

BACKGROUND

Concrete may be a composite construction material that may be used in building. Concrete may be comprised of a mixture of cement paste, sand and aggregates. The cement paste may comprise cement and water. The cement may be Ordinary Portland Cement, a type of cement made out of raw material such as limestone. The manufacturing of Ordinary Portland Cement produces more than 13 billion tons of carbon dioxide every year. This carbon dioxide emission is equivalent to 7% of the total global emission of carbon dioxide to the atmosphere. This carbon dioxide emission may lead to environmental problems such as global warming and the greenhouse effect.

SUMMARY

Disclosed are a system, a method and/or a composition of environment friendly composite construction material. In one aspect, a method includes providing a mixture of a pozzolanic material and/or a kaolin clay with an activator solution to form an alumino-silicate cementitious material through a resulting geo-polymerization process. The alumino-silicate cementitious material is in the form of a paste. The method also includes processing the alumino-silicate cementitious material to transform the alumino-silicate cementitious material that is in the form of the paste to a form of a powder of the alumino-silicate cementitious material. The method further includes mixing the alumino-silicate cementitious material which is in the form of the powder with water to control a workability of the alumino-silicate cementitious material. Furthermore the method includes combining a mixture of the alumino-silicate cementitious material and water with a coarse aggregate, a fine aggregate and/or a plasticizer to form a composite construction material. The composite construction material is concrete. The method of forming the composite construction material is free of carbon dioxide emission associated with the formation of the composite construction material.

The method further includes forming the activator solution through mixing a dry ingredient with an alkali hydroxide solution. The dry ingredient may be sodium silicate. The ratio of sodium silicate to the alkali hydroxide solution in the activator solution may be 0.5 to 3.5. The method also includes adjusting a concentration of the alkali hyroxide solution through diluting the alkali hydroxide solution with water. The pozzolanic material may be a fly ash. The activator solution is an alkali hyrdroxide. The alkali hydroxide is sodium hydroxide. The weight of the mixture of the pozzolanic material and the kaolin clay that is used to form the alumino-silicate cementitious material may range between 350 kilograms and 400 kilograms. The weight of the sodium hyroxide that is used to form the alumino-silicate cementitious material may range between 30 kilograms and 60 kilograms. The weight of the sodium silicate that is used to form the alumino-silicate cementitious material may range between 100 kilograms and 150 kilograms. The weight of the fine aggregate used to form the concrete may range between 500 kilograms and 600 kilograms. The weight of the coarse aggregate used to form the concrete may range between 1200 kilograms and 1400 kilograms. The weight of the water used to form the concrete may range between 60 kilograms and 400 kilograms.

The method of processing the alumino-silicate cementitious material to transform the alumino-silicate cementitious material that is in the form of the paste to a form of a powder of the alumino-silicate cementitious material, further includes drying the alumino-silicate cementitious material that is in the form of a paste at a temperature ranging between 40 C and 100 C through a normal drying process. The method also includes reducing the dried alumino-silicate cementitious material to the powder form through at least one of a grinding and pulverizing the dried alumino-silicate cementitious material when the alumino-silicate cementitious material is dried through a normal drying process at a temperature ranging between 40 C and 100 C.

The method of processing the alumino-silicate cementitious material to transform the alumino-silicate cementitious material that is in the form of the paste to a form of a powder of the alumino-silicate cementitious material, further includes spray drying the alumino silicate cementitious material that is in the form of a paste to transform the alumino silicate cementitious material that is in the form of the paste to the form of the powder. The method of spray drying further includes spraying the alumino silicate cementitious material that is in the form of a paste through a nozzle into an environment that has at a temperature ranging between 40 C and 100 C to transform the alumino silicate cementitious material that is in the form of a paste to the form of powder. The environment that has at a temperature ranging between 40 C and 100 C to which the alumino silicate cementitious material is sprayed to dry the sprayed alumino silicate cementitious material.

The method further includes curing the composite construction material through at least one of a curing process at a room temperature and a heat curing at a temperature ranging between 40 C and 120 C. The method also includes increasing a resistance of the composite construction material to an acidic environment through mixing the alkali hydroxide as activator with the pozzolanic material to form a crystalline alumino silicate cementitious material that is used to produce the composite construction material. The density of the composite construction material formed from the powdered alumino silicate cementitious material that is transformed to the form of powder through at least one of the spray drying and the normal drying the paste form of the alumino silicate cementitious material is based on the plasticizer that is added to the alumino silicate cementitious material to form the composite construction material. The koalin clay may reinforce the strength of the composite construction material. The fine aggregates and/or coarse aggregates may increase a compressive strength of the concrete.

In another aspect, a cement composition may include an alumino-silicate cementitious material that is formed through mixing a pozzolanic material, kaolin clay and sodium silicate in a dried and pulverized form in a solution of alkali hydroxide to form the alumino-silicate cementitious material through a process of geo-polymerization resulting from mixing the pozzolanic material, kaolin clay and sodium silicate in a dried and pulverized form in a solution of alkali hydroxide. The alumino-silicate cementitious material that is in the form of a paste is processed to transform the alumino-silicate cementitious material that is in the form of a paste to a the form of a powder. The composition further includes water mixed with the alumino-silicate cementitious material that is in the form of a powder to control a workability of the alumino-silicate cementitious material.

The composition also includes a fine aggregate to increase a compressive strength of the composite construction material when mixed with the mixture of alumino-silicate cementitious material and water. The composition further includes a coarse aggregate to increase a compressive strength of the composite construction material when mixed with the mixture of alumino-silicate cementitious material and water.

In yet another aspect, a method includes providing a mixture of at least one of a pozzolanic material and a kaolin clay with an activator solution to form an alumino-silicate cementitious material through a resulting geo-polymerization process. The alumino-silicate cementitious material is in the form of a paste. The method also includes processing the alumino-silicate cementitious material to transform the alumino-silicate cementitious material that is in the form of the paste to a form of a powder of the alumino-silicate cementitious material through a process of a spray drying. The method also includes mixing the alumino-silicate cementitious material which is in the form of the powder with water to control a workability of the alumino-silicate cementitious material. The method further includes combining a mixture of the alumino-silicate cementitious material and water with a coarse aggregate, a fine aggregate and/or a plasticizer to form a composite construction material. In one embodiment, the composite construction material is concrete. In one embodiment, the said method of forming the composite construction material is free of carbon dioxide emission associated with the formation of the composite construction material.

In another aspect, a method includes providing a mixture of at least one of a pozzolanic material and a kaolin clay with an activator solution to form an alumino-silicate cementitious material through a resulting geo-polymerization process. In one embodiment, the alumino-silicate cementitious material is in the form of a paste. The method also includes drying the alumino-silicate cementitious material that is in the form of a paste at a temperature ranging between 40 C and 100 C through a normal drying process. The method further includes reducing the dried alumino-silicate cementitious material to the form of a powder of the alumino-silicate cementitious material through a grinding and/or pulverizing the dried alumino-silicate cementitious material when the alumino-silicate cementitious material is dried through a normal drying process at a temperature ranging between 40 C and 100 C. The method also includes mixing the alumino-silicate cementitious material which is in the form of the powder with water to control a workability of the alumino-silicate cementitious material. The method further includes combining a mixture of the alumino-silicate cementitious material and water with a coarse aggregate, a fine aggregate and/or a plasticizer to form a composite construction material. In one embodiment, the composite construction material is concrete. In one embodiment, the method of forming the composite construction material is free of carbon dioxide emission associated with the formation of the composite construction material.

BRIEF DESCRIPTION OF THE DRAWINGS

Example embodiments are illustrated by way of example and not limitation in the figures of the accompanying drawings, in which like references indicate similar elements and in which:

FIG. 5 is a table view illustrating the amount of materials for producing a block of composite construction material, according to one or more embodiments.

FIG. 6 is a table illustrating the mechanical and physical properties of the composite construction materials, according to one or more embodiments.

Other features of the present embodiments will be apparent from the accompanying Drawings and from the Detailed Description that follows.

DETAILED DESCRIPTION

Disclosed are a system, a method and/or a composition of environment friendly composite construction material. It will be appreciated that the various embodiments discussed herein need not necessary belong to the same group of exemplary embodiments; and may be grouped into various other embodiments not explicitly disclosed herein. In the following description, for the purpose of explanation, numerous specific details are set forth in order to provide a thorough understanding of various embodiments.

Figure 1:
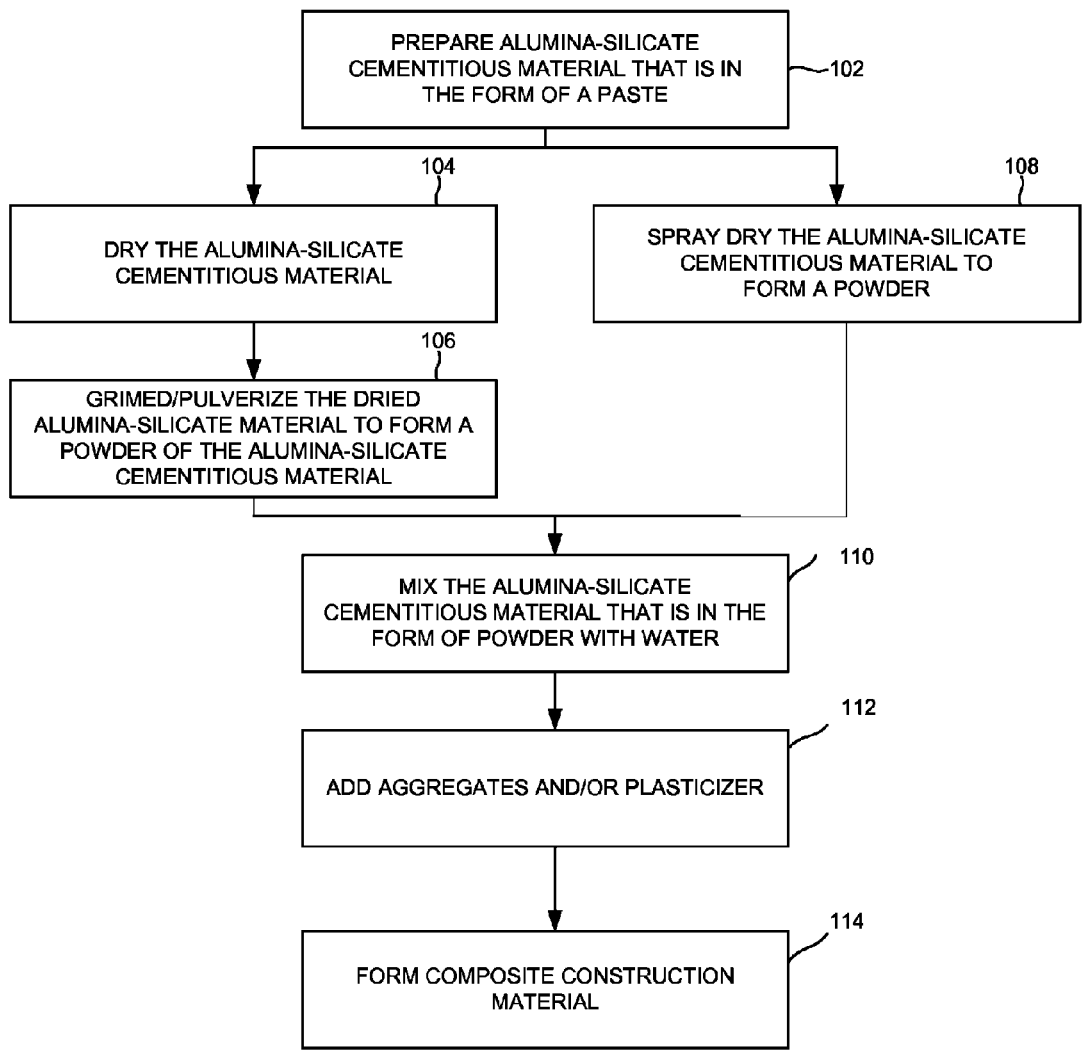
FIG. 1 is a flow diagram illustrating a method of producing composite construction material, according to one or more embodiments.

FIG. 1 is a flow diagram illustrating a method of producing a composite construction material, according to one or more embodiments. In one or more embodiments, in operation 102 an alumino silicate cementitious material may be prepared. In one embodiment, the alumino silicate cementitious material may be a geo-polymer cement. In one embodiment, the alumino silicate cementitious material may be prepared before forming the composite construction material. In one embodiment, the alumino silicate cementitious material may be prepared at a different location and then brought to the location of preparing the composite construction material. In one embodiment, the preparation of the alumino silicate cementitious material may be an environmentally friendly process. In one embodiment, the environmentally friendly process of preparing the alumino silicate cementitious material may be free of carbon dioxide ($CO_2$) emission. In one embodiment, the alumino silicate cementitious material may be in the form of a paste. In one embodiment, the alumino silicate cementitious material that is in the form of a paste may be prepared through mixing a pozzolanic material with an activator as shown in FIG. 2.

Figure 2:
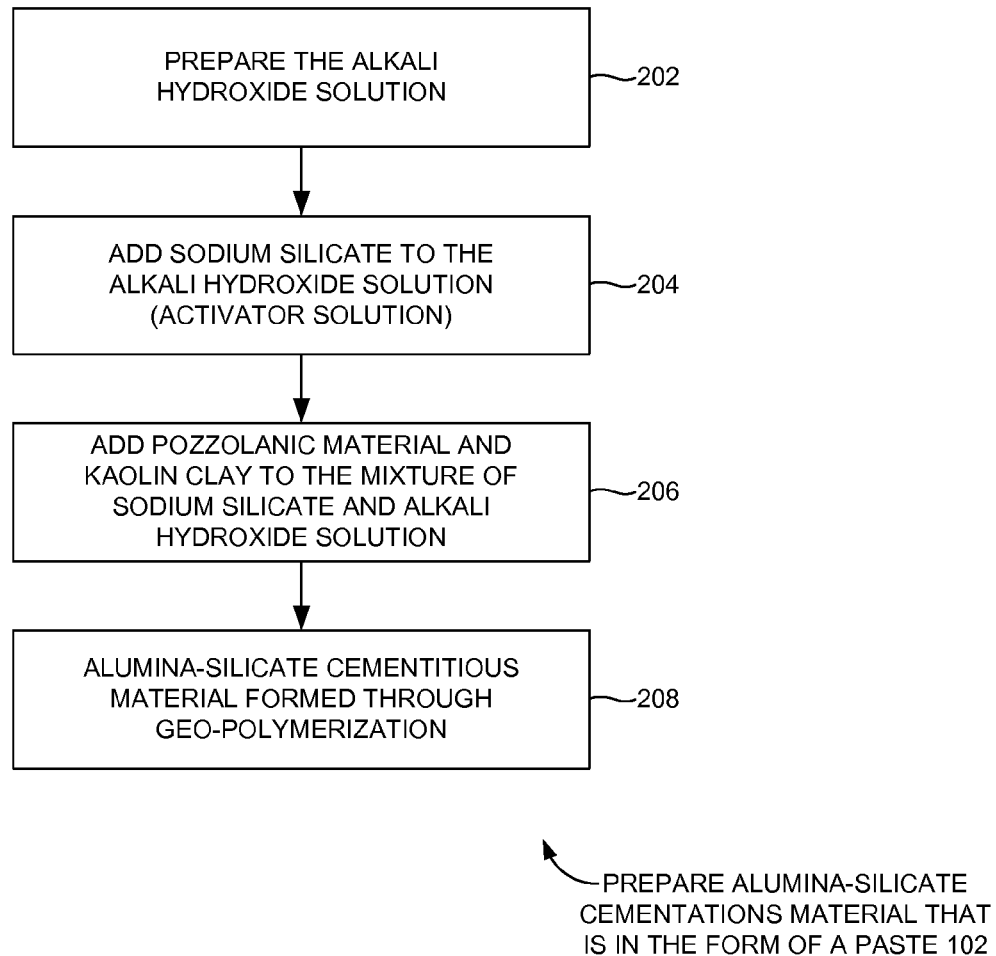
FIG. 2 is a flow diagram illustrating a method of preparing the alumino silicate cementitious material, according to one or more embodiments.

Now refer to FIG. 2. FIG. 2 is a flow diagram illustrating a method of preparing the alumino silicate cementitious material, according to one or more embodiments. In one or more embodiments, a mixture of sodium silicate, alkali hydroxide, pozzolanic material and clay may be prepared as a process of forming the alumino silicate cementitious material. In one or more embodiments, an alkali hyroxide solution may be prepared in operation 202. In one embodiment, the alkali hydroxide solution may be the activator. In one embodiment, the alkali hydroxide solution may be a sodium hydroxide solution.

In one or more embodiments, alkali hydroxide may be composed of an alkali metal cation and the hydroxide anion. In an example embodiment, the alkali hydroxide may be Lithium hydroxide (LiOH), Sodium hydroxide (NaOH), Potassium hydroxide (KOH), Rubidium hydroxide (RbOH) and/or Caesium hydroxide (CsOH). In one embodiment, the alkali hydroxide may be used in powder form. In one embodiment, the alkali hydroxide may also be used in liquid form, where it may be added after dry mixing of the other constituents and before the water is added. In one example embodiment, the alkali hydroxide may be at a concentration of 6.0 to 16.0 moles/liter (M). In another example embodiment, the alkali hydroxide may be at a concentration of 1.0 to 18.0 moles/liter (M). In one embodiment a concentration of the alkali hyroxide solution is adjusted through diluting the alkali hydroxide solution with water.

In one embodiment, the activator solution may be formed through mixing a dry ingredient with an alkali hydroxide solution, such as in operation 204. In one embodiment, the dry ingredient is sodium silicate and/or potassium silicate. In a preferred embodiment, the dry ingredient is sodium silicate. In one embodiment, the sodium silicate may be available in an aqueous solution and/or in solid form. The sodium silicate may increase the force character and durability for cement as fast-drying material.

In one embodiment, the ratio of sodium silicate to the alkali hydroxide solution in the activator solution is 0.5 to 3.5. In one embodiment, sodium silicate may be sodium metasilicate, $Na_2SiO_3$ Sodium metasilicate may be in powder form and may easily be dissolved in water. Sodium metasilicate be available in liquid or solid form. In one or more embodiments, the sodium metasilicate may reduce the porosity of the concrete that is eventually formed from the mixture.

In one embodiment, such as in operation 206 the mixture of a pozzolanic material and clay may be added to the mixture of sodium silicate and sodium hyrdroxide. In one embodiment, the pozzolanic material, clay and a sodium silicate may be dissolved in a solution of alkali hydroxide. In one or more embodiments, the pozzolanic material may be a material, that when combined with an alkali hydroxide, exhibits cementitious properties. Pozzolanic materials may be commonly used as an addition to cement concrete mixtures to increase the long-term strength of the concrete. In one or more embodiments, the pozzolanic material may include a siliceous and/or aluminous chemical substance, and may be highly vitreous. For example, the pozzolanic material may include a natural pozzolanic mineral, a lava mineral, a basalt, a fly ash, a blast furnace slag, a bottom ash, a recycled ash and a ground granulated blast furnace slag, etc. In one or more embodiments, the clay may be a kaolin. Kaolin may be preferred because of its ability to reinforce the strength of the concrete. In one or more embodiments, the ratio of the pozzolanic material to the alkali hydroxide may range from 1.0 to 3.5.

In one embodiment, mixing the pozzolanic material, clay and the activator solution may result in a geo-polymerization process, such as in operation 208. In one embodiment, said geo-polymerization may result in formation of the alumino silicate cementitious material. In one embodiment, the alumino silicate cementitious material may be in the form of a paste. In one or more embodiments, geo-polymerization may be the process of polymerizing silica and alumina containing minerals using alkali solvents. In a preferred embodiment, fly ash may be the pozzolanic material that is mixed along with alkali hydroxide, sodium silicate and clay to produce the alumino silicate cementitious material. Fly ash is a fine glass-like powder recovered from burning pulverized coal in electric power generating plants. In one embodiment, the reaction of silicon (Si) and aluminum (Al) content in fly ash under alkaline condition may form a three dimensional polymeric chain and ring structure that consist of Si—O—Al—O bonds. In one embodiment, with more bonds of Si—O—Al—O, the polymer strength increases, thus making the alumino silicate cementitious material a suitable composition to be used in producing the composite construction material (e., concrete). In one embodiment, the alkali hydroxide and sodium silicate may have the ability to disrupt the Si—O—Si bonds and produce hydrates of alkali-lime aluminosilicates. Thus, the combination of fly ash and clay with alkali hydroxide and sodium silicate contributes to the enhancement of mechanical properties of concretes, in one embodiment.

Figure 3:
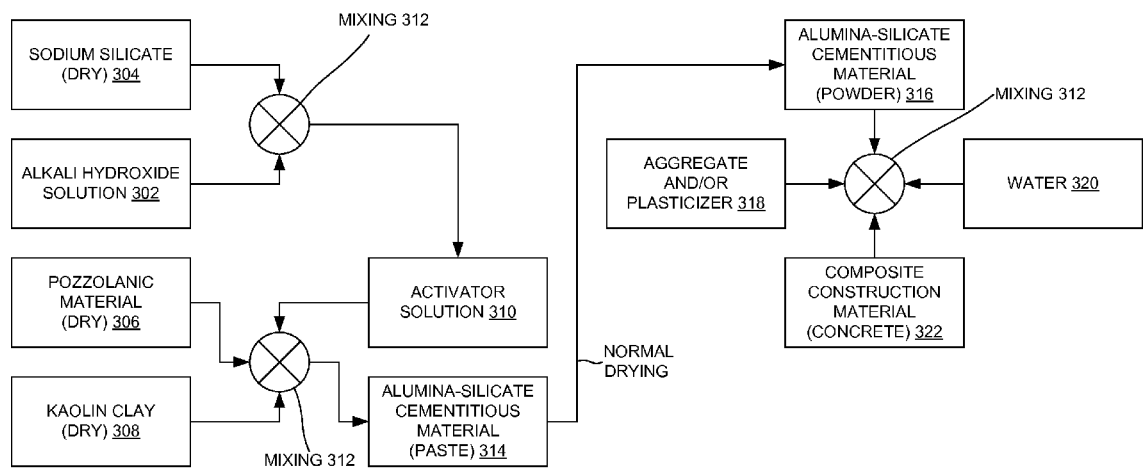
FIG. 3 is a graphical process flow diagram illustrating a method of producing composite construction material using normal drying process, according to one or more embodiments.
Figure 4:
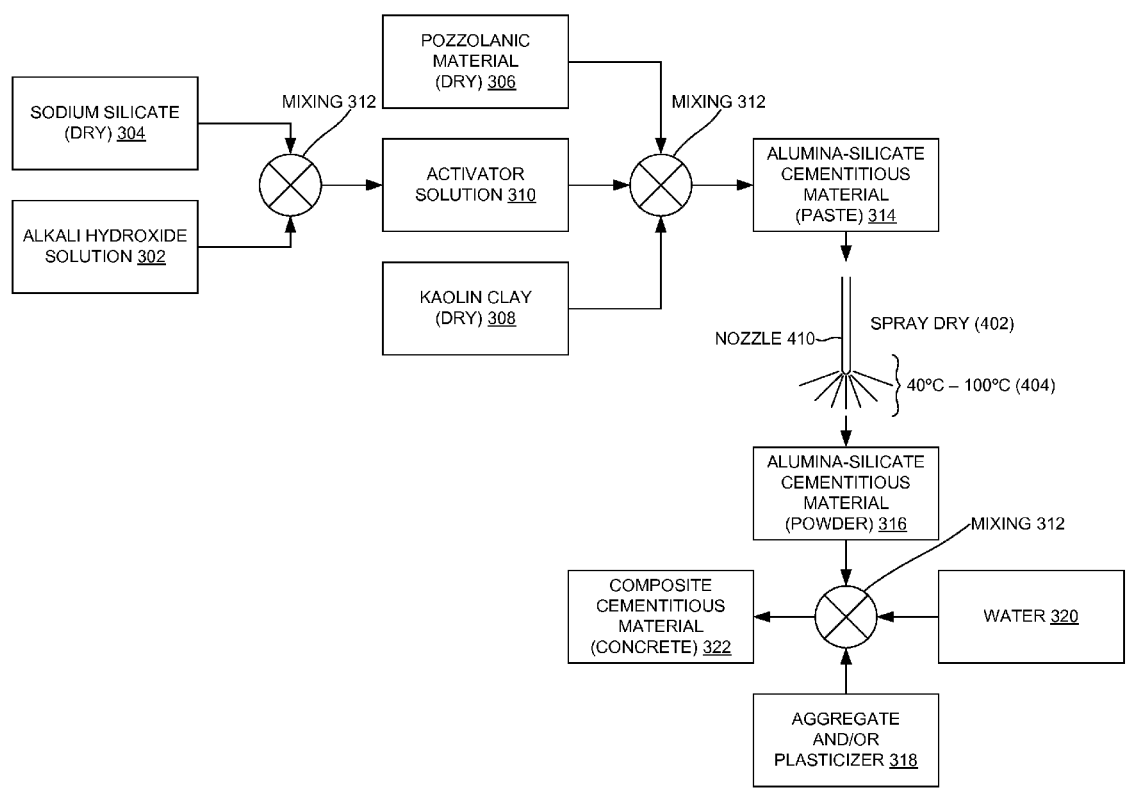
FIG. 4 is a graphical process flow diagram illustrating a method of producing composite construction material using spray-drying, according to one or more embodiments.

In one embodiment, the alumino silicate cementitious material that is in the form of a paste may be changed to the form of a powder as illustrated in FIG. 1, FIG. 3 and FIG. 4.

Now refer back to FIG. 1. In one embodiment, in operation 104, the alumino silicate cementitious material that is in the form of a paste may be dried using a normal drying process. In one embodiment, in the normal drying process, the alumino silicate cementitious material that is in the form of a paste may be dried at a temperature ranging from 40° to 100° Celsius (104° to 212° Fahrenheit). In one embodiment, the mixture may only require heating to a temperature range of 40° to 100° Celsius (104° to 212° Fahrenheit) because the mixture may be produced out of waste elements such as fly ash and kaolin. In one embodiment, the dried alumino silicate cementitious material may be ground and/or pulverized by a grinder to form a fine dried powder of alumino silicate cementitious material from the alumino silicate cementitious material that is in the form of a paste that is dried through normal drying, such as in operation 106. In one embodiment drying at temperature ranging from 40° to 100° Celsius (104° to 212° Fahrenheit) may consume significantly much less energy.

In one or more embodiments, such as in operation 108, the alumino silicate cementitious material that is in the form of a paste may be dried by using a spray drying process. In one embodiment, a spray drying process may be a method to convert a solution, suspension or emulsion into a solid powder in one single process step. In one embodiment, a spray drying process may be used to obtain crystalline product. The dried powder may be produced by spray drying the alumino silicate cementitious material that is in the form of a paste at temperature between 40° and 100° Celsius (104° to 212° Fahrenheit). In one embodiment, the spray drying process may include spraying the mixture through a nozzle into a high temperature vapor steam.

In one embodiment, the liquid cement may be vaporized to form a plurality of droplets. In one embodiment, the plurality of droplets may be dried to form a dried powder, such as in operation 108.

In operation 110, a required amount of water may be added into the dried powder to control a workability of the of the alumino-silicate cementitious material, in one embodiment. In one embodiment, the water may be mixed with the dried powder in a ratio ranging from 0.35 to 0.65. In one embodiment, the alumino silicate cementitious material paste formed through mixing the alumino silicate cementitious material in the form of powder with water may serve as a binder. In one embodiment, the binder may be a substance that may set and harden independently and bind other components together. In one embodiment, the alumino silicate cementitious material may be mixed with aggregate materials and/or plasticizers to produce a composite construction material (e.g., concrete), such as operation 112.

In one embodiment, the geo-polymer cement (e.g., alumino silicate cementitious material) paste may be mixed with one of sand, aggregate, plasticizer and/or nano additive to form the composite construction material (e.g., concrete), in operation 114. In one embodiment of operation 112, the geo-polymer cement (e.g., alumino silicate cementitious material) paste may be mixed with a coarse aggregate and/or a fine aggregate. In one embodiment, the aggregate may be a coarse particulate material, such as sand, gravel, crushed stone, slag, recycled concrete and/or geo-synthetic aggregates. In one embodiment, the aggregate may reinforce the structure of the composite material and strengthen the concrete (e.g., composite construction material). In one embodiment of operation 114, the mixture of aggregate and/or plasticizer and the cement paste may form a concrete (e.g., composite construction material).

In one embodiment, the plasticizer may determine a density and/or weight of the composite construction material (e.g., concrete). In one embodiment, a plasticizer may be an additive that increases the fluidity or plasticity of the concrete. The plasticizer may increase the workability of the mix, or decrease the amount of water required to achieve the desired workability. In one embodiment, the plasticizer may be manufactured from lignosulfanates. In one embodiment, the plasticizer may increase the strength of the concrete by decreasing the water to cement ratio. A light weight composite construction material (e.g., concrete) may be formed by mixing the cement paste with the plasticizer.

The weight/or density of a concrete cube with a size of 100×100×100 mm may be 1.8 kg to 2.4 kg when the concrete is produced from the alumino silicate cementitious material through drying based on normal drying and/or spray drying. In one embodiment, when plasticizer is added, weight/or density of a concrete cube with a size of 100×100×100 mm may be 1.0 kg to 1.6 kg. In one embodiment, the concrete cube with a size of 100×100×100 mm that weighs 1.0 kg to 1.6 kg may be considered a light weight concrete material.

In one embodiment, a superplasticizer may be added to make a very light weight concrete (e.g., composite construction material) with self-consolidating properties. A superplasticizer may be preferred because it may produce a concrete (e.g., composite construction material) with self-consolidating properties that enhances the performance of the concrete. In one embodiment, the superplasticizers may be linear polymers containing sulfonic acid groups attached to the polymer backbone. In one embodiment, the superplasticizers may also be known as high range water reducers. Superplasticizers may advantageously improve paste fluidity with reduction in the amount of water consumed during the preparation of the alumino silicate cementitious material paste. In one embodiment, superplasticizers may also increase the workability of the composite construction material.

In one embodiment, the mixture of alumino silicate cementitious material paste, aggregates, plasticizer and/or superplasticizer may be cured at room temperature and/or by heat curing at a temperature of 40° to 120° Celsius (104° to 248° Fahrenheit). In one embodiment, the composite construction material may be cured through a curing process at a room temperature and/or a heat curing at a temperature ranging between 40 C and 120 C, such as in operation 120. In one embodiment, a resistance of the composite construction material to an acidic environment may be increased through mixing the alkali hydroxide as activator with the pozzolanic material to form a crystalline alumino silicate cementitious material that is used to produce the composite construction material.

Now refer to FIG. 3 and FIG. 1. FIG. 3 is a graphical process flow diagram illustrating a method of producing composite construction material using normal drying process, according to one or more embodiments. In one embodiment, alkali hydroxide 302 solution that is diluted with water to form the required concentration may be mixed with sodium silicate 304 to form the activator solution 310. In one embodiment, preparation of the activator solution 310 is carried out by preparing an alkali hydroxide solution that has a concentration of 6 to 16M by adding water to it. In one embodiment, sodium hydroxide may be the preferred alkali hydroxide to be used. In one embodiment potassium hydroxide may also be used. In another embodiment, the concentration of the alkali hydroxide is 1.0 to 18M. In said embodiment, water is added to alkali hydroxide to produce an alkali hydroxide solution in the preferred concentration. In one embodiment, sodium hydroxide and/or potassium hydroxide may be used, with sodium hydroxide being the alkali hydroxide in a preferred embodiment. In one embodiment, sodium silicate may then be added to alkali hydroxide in a ratio of 0.5 to 3.5.

In one embodiment, clay 308 and a pozzolanic material 306 may be mixed together to form a dried powder mixture. In one embodiment, the alkali hydroxide 302 may be one of Lithium hydroxide (LiOH), Sodium hydroxide (NaOH), Potassium hydroxide (KOH), Rubidium hydroxide (RbOH) and/or Caesium hydroxide (CsOH). In one or more embodiments, a sodium silicate may be sodium metasilicate, $Na_2SiO_3$. In one or more embodiments, the clay 308 may be a kaolin clay. In one or more embodiments, the pozzolanic material 306 may include a siliceous and/or aluminous chemical substance, and may be highly vitreous. In an example embodiment, the pozzolanic material 306 may include a natural pozzolanic mineral, a lava mineral, a basalt, a fly ash, a blast furnace slag, a bottom ash, a recycled ash and a ground granulated blast furnace slag, etc. In one or more embodiments, the ratio of the pozzolanic material 306 to the alkali hydroxide 302 may range from 1.0 to 3.5. In one embodiment, the dried powder mixture of clay 308 and a pozzolanic material 306 may be mixed together with the activator solution 310 to form the alumino silicate cementitious material (e.g., geo-polymer cement) in the form of a paste 314, such as in operation 312.

In one embodiment, the alumino silicate cementitious material (e.g., geo-polymer cement) in the form of a paste 314 may be dried through a normal drying process to transform the alumino silicate cementitious material in the form of a powder 316. In one embodiment, in the normal drying process, the alumino silicate cementitious material (e.g., geo-polymer cement) in the form of a paste 314 may be dried at a temperature that ranges between 40° to 100° Celsius (104° to 212° Fahrenheit). In one embodiment, once the alumino silicate cementitious material (e.g., geo-polymer cement) in the form of a paste 314 is dried, the dried alumino silicate cementitious material (e.g., geo-polymer cement) may be ground and/or pulverized to transform the alumino silicate cementitious material in the form of a powder 316.

In one embodiment, a required amount of water 320 may be added to the to transform the alumino silicate cementitious material in the form of a powder 316 along with aggregates and/or plasticizers 318 to create a composite construction material (e.g., concrete) through curing said mixture at room temperature and/or by heat curing at a temperature of 40° to 120° Celsius (104° to 248° Fahrenheit). In one or more embodiments, the water 320 may be mixed with the alumino silicate cementitious material in the form of a powder 316 in a ratio ranging from 0.3 to 0.65. The cement (the alumino silicate cementitious material) paste formed through mixing the alumino silicate cementitious material in the form of a powder 316 with water 320 may serve as a binder, a substance that may set and harden independently and bind other components together. The cement paste may then be mixed with an aggregate and/or plasticizer 318 to form the composite construction material 322 (e.g., concrete). In one embodiment, the aggregate may be a coarse particulate material, such as sand, gravel, crushed stone, slag, recycled concrete and geosynthetic aggregates. In one embodiment, the aggregate may reinforce the structure of the composite material and strengthen the composite construction material (e.g., concrete 322).

Now refer to FIG. 4 and FIG. 1. FIG. 4 is a graphical process flow diagram illustrating a method of producing composite construction material using spray-drying, according to one or more embodiments. In one embodiment, alkali hydroxide 302 solution that is diluted with water to form the required concentration may be mixed with sodium silicate 304 to form the activator solution 310. In one embodiment, preparation of the activator solution 310 is carried out by preparing an alkali hydroxide solution that has a concentration of 6 to 16M by adding water to it. In one embodiment, sodium hydroxide may be the preferred alkali hydroxide to be used. In one embodiment potassium hydroxide may also be used. In another embodiment, the concentration of the alkali hydroxide is 1.0 to 18M. In said embodiment, water is added to alkali hydroxide to produce an alkali hydroxide solution in the preferred concentration. In one embodiment, sodium hydroxide and/or potassium hydroxide may be used, with sodium hydroxide being the alkali hydroxide in a preferred embodiment. In one embodiment, sodium silicate may then be added to alkali hydroxide in a ratio of 0.5 to 3.5.

In one embodiment, clay 308 and a pozzolanic material 306 may be mixed together to form a dried powder mixture. In one embodiment, the alkali hydroxide 302 may be one of Lithium hydroxide (LiOH), Sodium hydroxide (NaOH), Potassium hydroxide (KOH), Rubidium hydroxide (RbOH) and/or Caesium hydroxide (CsOH). In one or more embodiments, a sodium silicate may be sodium metasilicate, $Na_2SiO_3$. In one or more embodiments, the clay 308 may be a kaolin clay. In one or more embodiments, the pozzolanic material 306 may include a siliceous and/or aluminous chemical substance, and may be highly vitreous. In an example embodiment, the pozzolanic material 306 may include a natural pozzolanic mineral, a lava mineral, a basalt, a fly ash, a blast furnace slag, a bottom ash, a recycled ash and a ground granulated blast furnace slag, etc. In one or more embodiments, the ratio of the pozzolanic material 306 to the alkali hydroxide 302 may range from 1.0 to 3.5. In one embodiment, the dried powder mixture of clay 308 and a pozzolanic material 306 may be mixed together with the activator solution 310 to form the alumino silicate cementitious material (e.g., geo-polymer cement) in the form of a paste 314, such as in operation 312.

In one embodiment, the alumino silicate cementitious material (e.g., geo-polymer cement) in the form of a paste 314 may be dried through the spray drying process 402 to transform the alumino silicate cementitious material in the form of a powder 316. In one embodiment, in the spray drying process 402, the alumino silicate cementitious material in the form of a paste 314 may be sprayed through a nozzle 410 into a high-temperature vapor stream. In one embodiment, the alumino silicate cementitious material in the form of a paste 314 may form a plurality of droplets. In one embodiment, the plurality of droplets may be dried to form the alumino silicate cementitious material in the form of a powder 316 from the alumino silicate cementitious material in the form of a paste 314. The plurality of droplets may be dried at a temperature of 40° to 100° Celsius (104° to 212° Fahrenheit).

In one embodiment, a required amount of water 320 may be added to the to transform the alumino silicate cementitious material in the form of a powder 316 along with aggregates and/or plasticizers 318 to create a composite construction material (e.g., concrete) through curing said mixture at room temperature and/or by heat curing at a temperature of 40° to 120° Celsius (104° to 248° Fahrenheit). In one or more embodiments, the water 320 may be mixed with the alumino silicate cementitious material in the form of a powder 316 in a ratio ranging from 0.3 to 0.65. The cement (the alumino silicate cementitious material) paste formed through mixing the alumino silicate cementitious material in the form of a powder 316 with water 320 may serve as a binder, a substance that may set and harden independently and bind other components together. The cement paste may then be mixed with an aggregate and/or plasticizer 318 to form the composite construction material 322 (e.g., concrete). In one embodiment, the aggregate may be a coarse particulate material, such as sand, gravel, crushed stone, slag, recycled concrete and geosynthetic aggregates. In one embodiment, the aggregate 622 may reinforce the structure of the composite material and strengthen the concrete 630.

Now refer to FIG. 5 and FIG. 1. FIG. 5 is a table view illustrating the amount of materials for producing a block of composite construction material, according to one or more embodiments. In one or more embodiments, the material(s) 502 may be shown with respect to their weight 516. In one embodiment, the weight may be measured in Kilograms (KG). In one or more embodiments, the fly ash and kaolin 504 may be added in the amount of 350 to 400 KG. In one or more embodiments, the sodium silicate 506 may be present in the composite construction material (e.g., concrete) block in the amount of 100 to 150 KG. In one or more embodiments, sodium hydroxide (NaOH) 508 may be present in the composite construction material (e.g., concrete) block in an amount of 30 to 60 KG. In one or more embodiments the fine aggregate 510 may be present in the range of 500 to 600 KG in the composite construction material (e.g., concrete) block. In one or more embodiments, coarse aggregate 512 may be present in the range of 1200 to 1400 KG in the composite construction material (e.g., concrete) block. In one or more embodiments, water may be present in the range of 60 to 400 KG in the composite construction material (e.g., concrete) block. In one embodiment, the composite construction material (e.g., concrete) block may be cubical. In one embodiment the size of the cubical composite construction material (e.g., concrete) block may be 100×100×100 mm.

Now refer to FIG. 6 and FIG. 1. FIG. 6 is a table illustrating the mechanical and physical properties of the composite construction materials, according to one or more embodiments. In an example embodiment, the properties 602 may refer to the properties of the composite construction material (e.g., concrete) 604 and the light weight composite construction material (e.g., concrete) 306 as mentioned in FIG. 1. In the embodiment of FIG. 6, the properties 602 illustrated may include compressive strength 608, density 610, water absorption 612, fire resistance 614, porosity 616, setting time 618 and/or strength gain 620.

In an example embodiment, the compressive strength 608 may be measured by breaking a cylindrical concrete specimen in a compression-testing machine. In one or more embodiments, the compressive strength 608 of the composite construction material (e.g., concrete) 604 may be 15 to 80 MPa (Mega Pascal). The compressive strength of a light weight composite construction material (e.g., concrete) 606 may be 10 to 40 MPa (Mega Pascal).

The density of concrete may be a measure of its mass per unit volume. In one or more embodiments, density 610 of the composite construction material (e.g., concrete) 604 may be 1800 to 2400 KG/M$^3$. In one or more embodiments, density of the light weight composite construction material (e.g., concrete) 606 may be 1000 to 1600 KG/M$^3$ Water absorption 612 may be a ratio of the weight of the water absorbed by a composite material to the weight of the dry materials in the composite material. In one embodiment, too much water absorption may cause a composite construction material to lose its beneficial properties, such as strength. In one or more embodiments, the water absorption 612 of the composite construction material (e.g., concrete) 604 may range between 0.01 to 2.00%. The water absorption 612 of the light weight composite construction material (e.g., concrete) 606 may range between 0.1 to 5.0%.

Fire resistance 614 may be the ability of a composite construction material to withstand effects of fire. In one or more embodiments, a fire resistance 614 capacity of the composite construction material (e.g., concrete) 604 is indicated by the fact that the composite construction material (e.g., concrete) 604 may be stable at temperatures up to 1000° C. (1832° F.). The fire resistance 614 capacity of the light weight composite construction material (e.g., concrete) 606 is indicated by the fact that the light weight composite construction material (e.g., concrete) 606 may be stable at temperatures up to 1000° C. (1832° F.). In one embodiment, a resistance of the composite construction material to an acidic environment and/or fire is increased through mixing the alkali hydroxide as activator with the pozzolanic material to form a crystalline alumino silicate cementitious material that is used to produce the composite construction material.

In one or more embodiments, porosity 616 may be a measure of the void spaces in a material. Porosity 616 may be expressed as a percentage of the volume of voids in a total volume. In one embodiment, porosity 616 may be inversely related to concrete strength. High porosity percentage may make the composite construction material (e.g., concrete) weaker and/or easy to break. The porosity of the composite construction material (e.g., concrete) 604 may be 0.1 to 0.4%. The porosity of the light weight composite construction material (e.g., concrete) 606 may be 0.1 to 30%.

In one or more embodiments, the required setting time 618 may be the time it takes the concrete to harden. In one or more embodiments, the required setting time 618 for the composite construction material (e.g., concrete) 604 may be 1-2 hours. In one embodiment, the composite construction material (e.g., concrete) 604 may gain full strength in 1-3 days. The required setting time 618 for the light weight composite construction material (e.g., concrete) 606 may be between 2 to 4 hours. The light weight composite construction material (e.g., concrete) 606 may gain full strength within 1 to 3 days.

Figure 7:
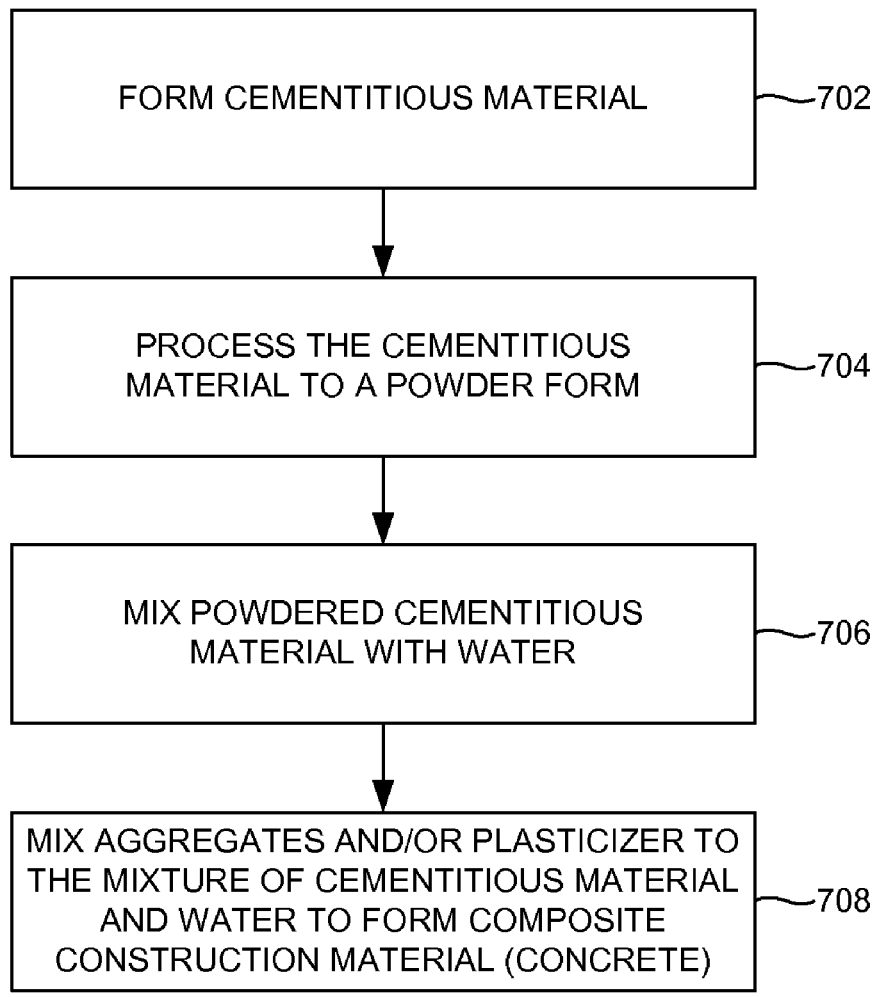
FIG. 7 is a process flow diagram illustrating a method of producing composite construction material, according to one or more embodiments.

FIG. 7 is a process flow diagram illustrating a method of producing composite construction material, according to one or more embodiments. In one or more embodiments, in operation 702, a mixture of at least one of a pozzolanic material and a kaolin clay is provided with an activator solution to form an alumino-silicate cementitious material through a resulting geo-polymerization process. In one embodiment, the alumino-silicate cementitious material is in the form of a paste. In one embodiment, in operation 704, the alumino-silicate cementitious material (e.g., geo-polymer cement) is processed to transform the alumino-silicate cementitious material that is in the form of the paste to a form of a powder of the alumino-silicate cementitious material (e.g., geo-polymer cement). In one embodiment, in operation 706 the alumino-silicate cementitious material which is in the form of the powder is mixed with water to control a workability of the alumino-silicate cementitious material. In one embodiment, in operation 708, a mixture of the alumino-silicate cementitious material (e.g., geo-polymer cement) and water is mixed with a coarse aggregate, a fine aggregate and/or a plasticizer to form a composite construction material (e.g., concrete). In one embodiment, the composite construction material is concrete. In one embodiment, the said method of forming the composite construction material is free of carbon dioxide emission that is associated with the formation of the composite construction material.

Figure 8:
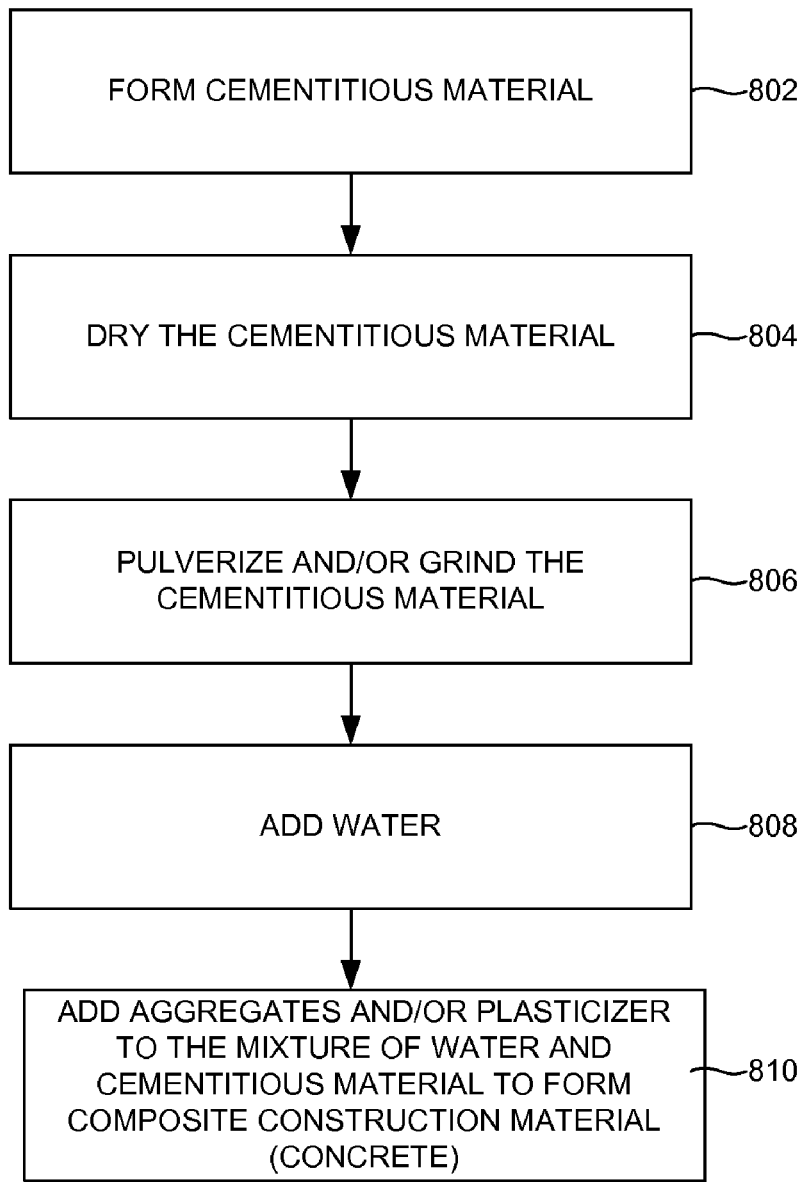
FIG. 8 is a process flow diagram illustrating a method of producing composite construction material using a spray drying process, according to one or more embodiments.

FIG. 8 is a process flow diagram illustrating a method of producing composite construction material using a spray drying process, according to one or more embodiment. In operation 802 a mixture of at least one of a pozzolanic material and a kaolin clay is provided with an activator solution to form an alumino-silicate cementitious material through a resulting geo-polymerization process. In one embodiment, the alumino-silicate cementitious material is in the form of a paste. In one embodiment, in operation 804 the alumino-silicate cementitious material is processed to transform the alumino-silicate cementitious material that is in the form of the paste to a form of a powder of the alumino-silicate cementitious material through a process of a spray drying. In one embodiment, in operation 806 the alumino-silicate cementitious material which is in the form of the powder is mixed with water to control a workability of the alumino-silicate cementitious material. In one embodiment, in operation 808 a mixture of the alumino-silicate cementitious material and water is combined with a coarse aggregate, a fine aggregate and/or a plasticizer to form a composite construction material. In one embodiment, the composite construction material is concrete. In one embodiment, the said method of forming the composite construction material is free of carbon dioxide emission associated with the formation of the composite construction material.

Figure 9:
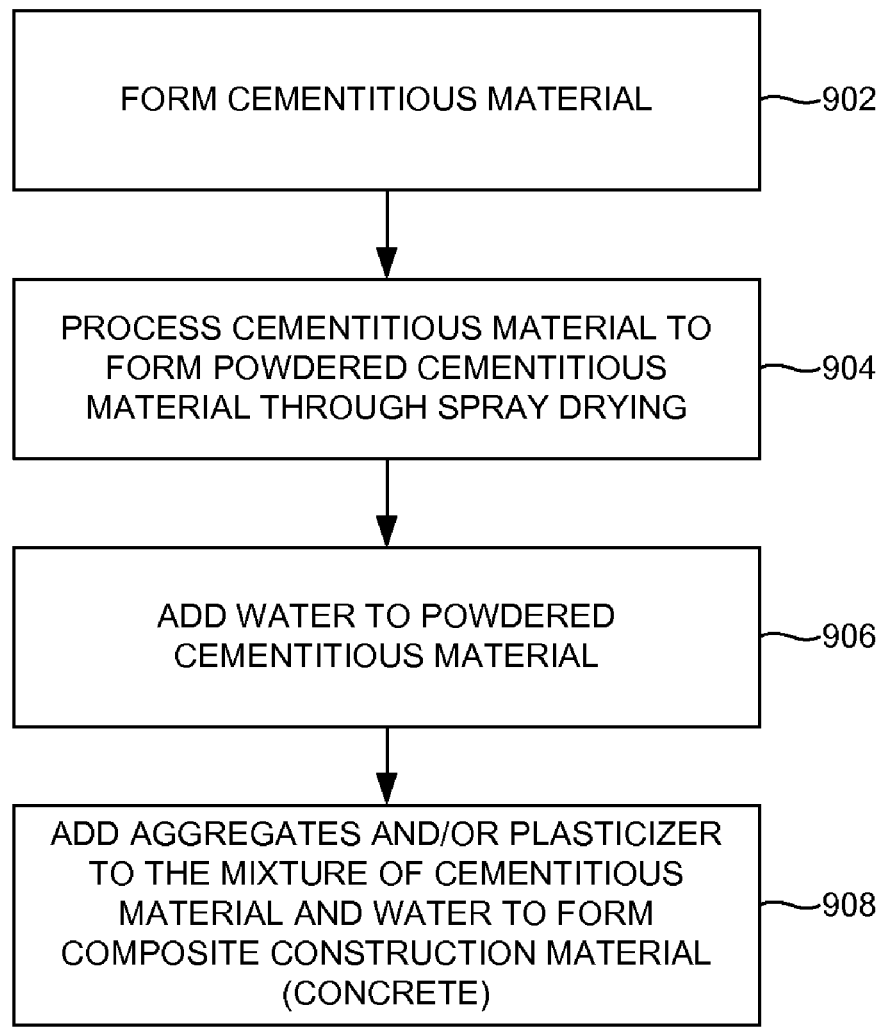
FIG. 9 is a process flow diagram illustrating a method of producing composite construction material using a normal drying process, according to one or more embodiment.

FIG. 9 is a process flow diagram illustrating a method of producing composite construction material using a normal drying process, according to one or more embodiment. In one embodiment, in operation 902 a mixture of at least one of a pozzolanic material and a kaolin clay is provided with an activator solution to form an alumino-silicate cementitious material through a resulting geo-polymerization process. In one embodiment, the alumino-silicate cementitious material is in the form of a paste. In one embodiment, in operation 904 the alumino-silicate cementitious material that is in the form of a paste is dried at a temperature ranging between 40 C and 100 C through a normal drying process. In one embodiment, in operation 906, the dried alumino-silicate cementitious material is reduced to the form of a powder of the alumino-silicate cementitious material through a grinding and/or pulverizing the dried alumino-silicate cementitious material when the alumino-silicate cementitious material is dried through a normal drying process at a temperature ranging between 40 C and 100 C. In one embodiment, in operation 908, the alumino-silicate cementitious material which is in the form of the powder is mixed with water to control a workability of the alumino-silicate cementitious material. In one embodiment, in operation 910, a mixture of the aluminosilicate cementitious material and water is combined with a coarse aggregate, a fine aggregate and/or a plasticizer to form a composite construction material. In one embodiment, the composite construction material is concrete. In one embodiment, the method of forming the composite construction material is free of carbon dioxide emission associated with the formation of the composite construction material.

Although the present embodiments have been described with reference to specific example embodiments, it will be evident that various modification and changes may be made to these embodiments without departing from the broader spirit and scope of the various embodiments. Accordingly, the specification and drawings are to be regarded in an illustrative rather than a restrictive sense.

What is claimed is:

1. A method of forming a composite construction material comprising the steps of:
   providing a mixture of at least one of a pozzolanic material and a kaolin clay with an activator solution to form an alumino-silicate cementitious material through a resulting geo-polymerization process, the alumino-silicate cementitious material is in the form of a paste;
   processing the alumino-silicate cementitious material to transform the alumino-silicate cementitious material that is in the form of the paste to a form of a powder of the alumino-silicate cementitious material;
   mixing the alumino-silicate cementitious material which is in the form of the powder with water to control a workability of the alumino-silicate cementitious material; and
   combining a mixture of the alumino-silicate cementitious material and water with at least one of a coarse aggregate, a fine aggregate and a plasticizer to form a composite construction material, wherein the composite construction material is concrete, wherein the method of forming the composite construction material is free of carbon dioxide emission associated with the formation of the composite construction material;
   wherein a weight of the mixture of the pozzolanic material and the kaolin clay that is used to form the alumino-silicate cementitious material ranges between 350 kilograms and 400 kilograms;
   wherein the weight of a sodium hydroxide that is used to form the alumino-silicate cementitious material ranges between 30 kilograms and 60 kilograms;
   wherein the weight of the sodium silicate that is used to form the alumino-silicate cementitious material ranges between 100 kilograms and 150 kilograms;
   wherein the weight of the fine aggregate used to form the concrete ranges between 500 kilograms and 600 kilograms;
   wherein the weight of the coarse aggregate used to form the concrete ranges between 1200 kilograms and 1400 kilograms; and
   wherein the weight of the water used to form the concrete ranges between 60 kilograms and 400 kilograms.

2. The method of claim 1, further comprising:
   forming the activator solution through mixing a dry ingredient with an alkali hydroxide solution, wherein the dry ingredient is sodium silicate, wherein the ratio of sodium silicate to the alkali hydroxide solution in the activator solution is 0.5 to 3.5; and
   adjusting a concentration of the alkali hydroxide solution through diluting the alkali hydroxide solution with water.

3. The method of claim 1:
   wherein the pozzolanic material is a fly ash, wherein the activator solution is an alkali hydroxide, and wherein the alkali hydroxide is the sodium hydroxide.

4. The method of claim 1, wherein processing the alumino-silicate cementitious material to transform the alumino-silicate cementitious material that is in the form of the paste to a form of a powder of the alumino-silicate cementitious material, further comprising:
   drying the alumino-silicate cementitious material that is in the form of a paste at a temperature ranging between 40° C. and 100° C. through a normal drying process; and
   reducing the dried alumino-silicate cementitious material to the powder form through at least one of a grinding and pulverizing the dried alumino-silicate cementitious material when the alumino-silicate cementitious material is dried through a normal drying process at a temperature ranging between 40° C. and 100° C.

5. The method of claim 1, wherein processing the alumino-silicate cementitious material to transform the alumino-silicate cementitious material that is in the form of the paste to a form of a powder of the alumino-silicate cementitious material, further comprising spray drying the alumino silicate cementitious material that is in the form of a paste to transform the alumino silicate cementitious material that is in the form of the paste to the form of the powder.

6. The method of claim 5, wherein the spray drying further comprising:
   spraying the alumino silicate cementitious material that is in the form of a paste through a nozzle into an environment that has at a temperature ranging between 40° C. and 100° C. to transform the alumino silicate cementitious material that is in the form of a paste to the form of powder,
   wherein the environment that has at a temperature ranging between 40° C. and 100° C. to which the alumino silicate cementitious material is sprayed to dry the sprayed alumino silicate cementitious material.

7. The method of claim 1, wherein the density of the composite construction material formed from the powdered alumino silicate cementitious material that is transformed to the form of powder through at least one of the spray drying and the normal drying the paste form of the alumino silicate cementitious material is based on the plasticizer that is added to the alumino silicate cementitious material to form the composite construction material.

8. The method of claim 1, further comprising:
   curing the composite construction material through at least one of a curing process at a room temperature and a heat curing at a temperature ranging between 40° C. and 120° C.; and
   increasing a resistance of the composite construction material to an acidic environment through mixing the alkali hydroxide as activator with the pozzolanic material to form a crystalline alumino silicate cementitious material that is used to produce the composite construction material.

9. The method of claim 1:
   wherein the kaolin clay reinforces the strength of the composite construction material, and
   wherein at least one of the fine aggregates and coarse aggregates increases the compressive strength of the concrete.

10. A method of forming a composite construction material comprising the steps of:
    providing a mixture of at least one of a pozzolanic material and a kaolin clay with an activator solution to form an alumino-silicate cementitious material through a resulting geo-polymerization process, the alumino-silicate cementitious material is in the form of a paste;

processing the alumino-silicate cementitious material to transform the alumino-silicate cementitious material that is in the form of the paste to a form of a powder of the alumino-silicate cementitious material through at least one of a process of a spray drying and a normal drying;

mixing the alumino-silicate cementitious material which is in the form of the powder with water to control a workability of the alumino-silicate cementitious material; and combining a mixture of the alumino-silicate cementitious material and water with at least one of a coarse aggregate, a fine aggregate and a plasticizer to form a composite construction material, wherein the composite construction material is concrete, wherein the method of forming the composite construction material is free of carbon dioxide emission associated with the formation of the composite construction material;

wherein the pozzolanic material is a fly ash, wherein the activator solution is an alkali hydroxide, wherein the alkali hydroxide is at least one of a sodium hydroxide and a potassium hydroxide, wherein a weight of the mixture of the pozzolanic material and the kaolin clay that is used to form the alumino-silicate cementitious material ranges between 350 kilograms and 400 kilograms, wherein the weight of the sodium hydroxide that is used to form the alumino-silicate cementitious material ranges between 30 kilograms and 60 kilograms, wherein the weight of the sodium silicate that is used to form the alumino-silicate cementitious material ranges between 100 kilograms and 150 kilograms, wherein the weight of the fine aggregate used to form the concrete ranges between 500 kilograms and 600 kilograms, wherein the weight of the coarse aggregate used to form the concrete ranges between 1200 kilograms and 1400 kilograms, and wherein the weight of the water used to form the concrete ranges between 60 kilograms and 400 kilograms.

11. The method of claim 10, further comprising:

forming the activator solution through mixing a dry ingredient with an alkali hydroxide solution, wherein the dry ingredient is sodium silicate, wherein the ratio of sodium silicate to the alkali hydroxide solution in the activator solution is 0.5 to 3.5; and adjusting a concentration of the alkali hydroxide solution through diluting the alkali hydroxide solution with water;

spraying the alumino silicate cementitious material that is in the form of a paste through a nozzle into an environment that has at a temperature ranging between 40° C. and 100° C. to dry the alumino silicate cementitious material in the form of the paste and to transform the alumino silicate cementitious material in the form of the paste to the form of powder, wherein the environment that has at a temperature ranging between 40° C. and 100° C. to which the alumino silicate cementitious material is sprayed to dry the sprayed alumino silicate cementitious material;

drying the alumino-silicate cementitious material that is in the form of a paste at a temperature ranging between 40° C. and 100° C. through a normal drying process;

reducing the dried alumino-silicate cementitious material to the form of a powder of the alumino-silicate cementitious material through at least one of a grinding and pulverizing the dried alumino-silicate cementitious material when the aluminosilicate cementitious material is dried through a normal drying process at a temperature ranging between 40° C. and 100° C.;

curing the composite construction material through at least one of a curing process at a room temperature and a heat curing at a temperature ranging between 40° C. and 120° C.; and increasing a resistance of the composite construction material to an acidic environment through mixing the alkali hydroxide as activator with the pozzolanic material to form a crystalline alumino silicate cementitious material that is used to produce the composite construction material.

12. The method of claim 10, further comprising:

wherein the density of the composite construction material is based on the plasticizer that is added to the alumino silicate cementitious material to form the composite construction material, wherein the kaolin clay reinforces the strength of the composite construction material, and wherein at least one of the fine aggregates and coarse aggregates to increases the compressive strength of the concrete.

* * * * *